United States Patent
Park

(10) Patent No.: US 10,052,859 B2
(45) Date of Patent: Aug. 21, 2018

(54) APPARATUS AND METHOD FOR RECLAIMING CURVED AND BENDABLE DISPLAY SCREENS

(71) Applicant: Euna Park, Plano, TX (US)

(72) Inventor: Euna Park, Plano, TX (US)

( * ) Notice: Subject to any disclaimer, the term of this patent is extended or adjusted under 35 U.S.C. 154(b) by 18 days.

(21) Appl. No.: 14/701,970

(22) Filed: May 1, 2015

(65) Prior Publication Data

US 2016/0318296 A1    Nov. 3, 2016

(51) Int. Cl.
    *B32B 38/10*    (2006.01)
    *B32B 43/00*    (2006.01)
    B32B 37/12    (2006.01)

(52) U.S. Cl.
    CPC ........... *B32B 43/006* (2013.01); *B32B 37/12* (2013.01); *B32B 38/10* (2013.01); *B32B 2457/20* (2013.01); *Y10T 156/1153* (2015.01); *Y10T 156/1911* (2015.01)

(58) Field of Classification Search
    CPC . B32B 38/10; B32B 43/006; Y10T 156/1153; Y10T 156/1911
    USPC .................. 156/711, 752, 924, 937
    See application file for complete search history.

(56) References Cited

U.S. PATENT DOCUMENTS

| | | | | |
|---|---|---|---|---|
| 3,894,858 A | * | 7/1975 | Rogers | C03B 25/02 445/2 |
| 4,406,411 A | * | 9/1983 | Gall | B03B 9/061 241/14 |
| 4,482,005 A | * | 11/1984 | Voorhees | C21D 6/04 148/578 |
| 4,794,761 A | * | 1/1989 | Fredrixon | B65D 88/744 62/388 |
| 5,070,603 A | * | 12/1991 | Waldsmith | B08B 7/0092 156/701 |
| 5,309,722 A | * | 5/1994 | Phillips, Jr. | F25D 3/10 62/373 |
| 5,448,817 A | * | 9/1995 | Waldsmith | H01L 21/4882 156/709 |

(Continued)

FOREIGN PATENT DOCUMENTS

WO    WO2014141311    *    9/2014

*Primary Examiner* — Mark A Osele
*Assistant Examiner* — Nickolas Harm
(74) *Attorney, Agent, or Firm* — Sul Lee PLLC

(57) ABSTRACT

An apparatus for disassembling a display screen device. The apparatus comprises: 1) a container configured to receive liquid nitrogen into a liquid nitrogen chamber within the container, wherein at least one portion of the container has at least one vent hole that enables cold nitrogen gas to escape from the container; and 2) a cover configured to be brought into contact with the container to thereby form a nitrogen gas chamber that receives the nitrogen gas escaping from the container. The display screen device is disposed within the nitrogen gas chamber. The nitrogen gas freezes exposed surfaces of the display screen device. An adhesive layer disposed in a cooling area of the display screen device proximate an exposed surface loses it adhesiveness as the cooling area becomes colder. The apparatus further comprises an insulation pad disposed within the nitrogen gas chamber and configured to be brought into contact with a protected surface of the display screen device. The insulation pad creates a cooling protect area within the display screen device proximate the protected surface.

11 Claims, 6 Drawing Sheets

(56) References Cited

U.S. PATENT DOCUMENTS

| | | | | |
|---|---|---|---|---|
| 5,630,327 | A | * | 5/1997 | Kiczek .................... A23L 3/361 62/374 |
| 5,878,582 | A | * | 3/1999 | Appolonia ............... A23L 3/362 62/374 |
| 7,909,959 | B2 | * | 3/2011 | Tada .......................... C09J 5/00 156/706 |
| 8,181,688 | B2 | * | 5/2012 | Johnson ............ H01L 21/67092 156/711 |
| 2003/0079829 | A1 | * | 5/2003 | Ueyama .................. B32B 38/10 156/230 |
| 2010/0154992 | A1 | * | 6/2010 | Feinstein ............ B32B 38/0004 156/711 |
| 2010/0168726 | A1 | * | 7/2010 | Brookman ......... A61B 18/0218 606/22 |
| 2013/0000684 | A1 | * | 1/2013 | Soma ................ H01L 21/67051 134/36 |
| 2013/0048224 | A1 | * | 2/2013 | George ............. H01L 21/67282 156/752 |
| 2015/0083340 | A1 | * | 3/2015 | Price .................... B32B 43/006 156/701 |

* cited by examiner

APPARATUS AND METHOD FOR RECLAIMING CURVED AND BENDABLE DISPLAY SCREENS

TECHNICAL FIELD

The present application relates generally to an apparatus and method for disassembling a curved or bendable display screen during repair of the display screen.

BACKGROUND

The high cost of many smartphones makes it economically viable to repair a damaged smartphone rather than replace it. While a consumer might well throw away an inexpensive cellphone if the screen cracked after being dropped, the consumer will instead repair an expensive smartphone. As a result, there is a substantial market for replacing cracked screens and other parts of smartphones.

One common method of separating the parts of a smartphone uses liquid nitrogen ($N_2$) that is poured on the screen of the smartphone. The top glass layer of a smart phone is typically adhered to the layers of the touch screen below it by means of a layer of optical clear adhesive. After a few seconds of the liquid nitrogen resting on the surface of the glass, the optical clear adhesive freezes and loses its adhesive properties. A simple tap on the glass is then sufficient to separate the glass layer from the touch screen components.

Recently, however, curved screens and bendable screens have entered the smartphone marketplace. The surface glass of these devices is not flat and the components and materials for the display assembly are significantly different than those in flat screen displays. Also, removing these screens is further complicated because the liquid nitrogen will simply run off the curved surface of the glass. Therefore, there is a need for improved techniques for repairing the curved and/or flexible screens of a smartphone. There is a further need for a device that will optimize the environment and conditions in using liquid nitrogen that will prevent defects when the temperature is very low and the surface screen is being separated.

SUMMARY

To address the above-discussed deficiencies of the prior art and to develop technologies that are compatible to the new display changes, it is a primary object to provide an apparatus for disassembling a display screen device including curved and bendable touch display screen device. The apparatus comprises: 1) a container configured to receive liquid nitrogen into a liquid nitrogen chamber within the container, wherein at least one portion of the container has at least one vent hole that enables cold nitrogen gas to escape from the container; and 2) a cover configured to be brought into contact with the container to thereby form a nitrogen gas chamber that receives the nitrogen gas escaping from the container. The display screen device is disposed within the nitrogen gas chamber.

According to one embodiment, the nitrogen gas freezes exposed surfaces of the display screen device.

According to another embodiment, an adhesive layer disposed in a cooling area of the display screen device proximate an exposed surface loses it adhesiveness as the cooling area becomes colder.

According to still another embodiment, the apparatus further comprises an insulation pad disposed within the nitrogen gas chamber and configured to be brought into contact with a protected surface of the display screen device.

According to yet another embodiment, the insulation pad creates a cooling protect area within the display screen device proximate the protected surface.

According to a further embodiment, an adhesive layer disposed in the cooling protect area of the display screen device retains its adhesiveness as other portions of the display screen device become colder.

It is another object to provide a method of disassembling a display screen device. The method comprises: 1) using nitrogen gas to partially freeze a first part of the display screen device; 2) waiting until an adhesive layer in the first part of the display screen device cools sufficiently to lose its adhesiveness; and 3) separating the first part of the display screen device from the remainder of the display screen device.

In one embodiment, using nitrogen gas comprises: i) evaporating liquid nitrogen to form the nitrogen gas; and ii) exposing the first part of the display screen device to the nitrogen gas.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus for repairing display screens.

The present disclosure describes a technique that uses very cold nitrogen ($N_2$) gas in place of liquid nitrogen to freeze and separate the components of any electronic device that uses adhesives to attach component layers. Such electronic devices may include a smartphone, including a touch screen of a smartphone device.

Figure 1:
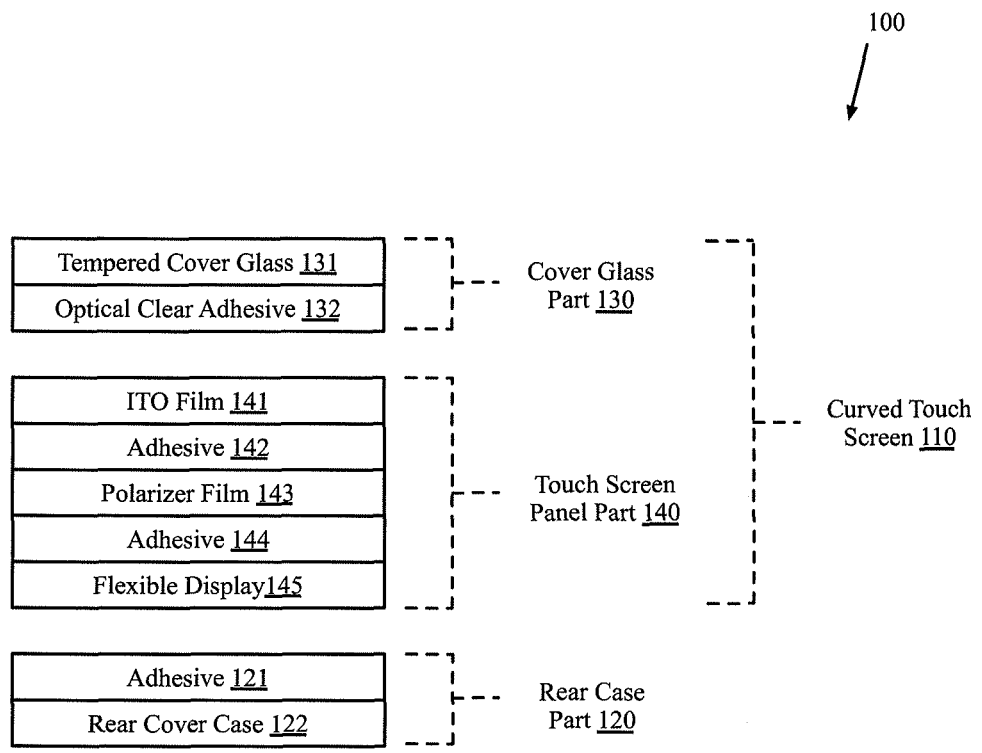
FIG. 1 illustrates a conventional touch screen device according to an embodiment of the disclosure.

FIG. 1 illustrates conventional touch screen device 100 according to an embodiment of the disclosure. Device 100 comprises curve touch screen part 110 and rear case part 120. Curved touch screen part 110 comprises cover glass part 130 and touch screen panel part 140. Rear case part 120 comprises adhesive layer 121 and rear cover case 122. Cover glass part 130 comprises tempered cover glass 131 and optical clear adhesive layer 132. Touch screen panel part 140 comprises indium tin oxide (ITO) film 141, adhesive layer 142, polarizer film layer 143, adhesive layer 144, and flexible display 145.

Optical clear adhesive layer 132 is a clear adhesive that attaches tempered cover glass 131 to ITO film layer 141. At normal environmental temperatures, the adhesive properties of optical clear adhesive layer 132 are strong. However, at very low temperatures, the adhesiveness of optical clear adhesive layer 132 greatly diminishes and a slight tap can separate tempered cover glass 131 from ITO film layer 141. Similarly, adhesive layer 121 attaches rear cover case 122 to the back surface of flexible display 145. At very low temperatures, the adhesiveness of adhesive layer 121 greatly diminishes and a slight tap can separate rear cover case 122 from flexible display 145.

Figure 2:
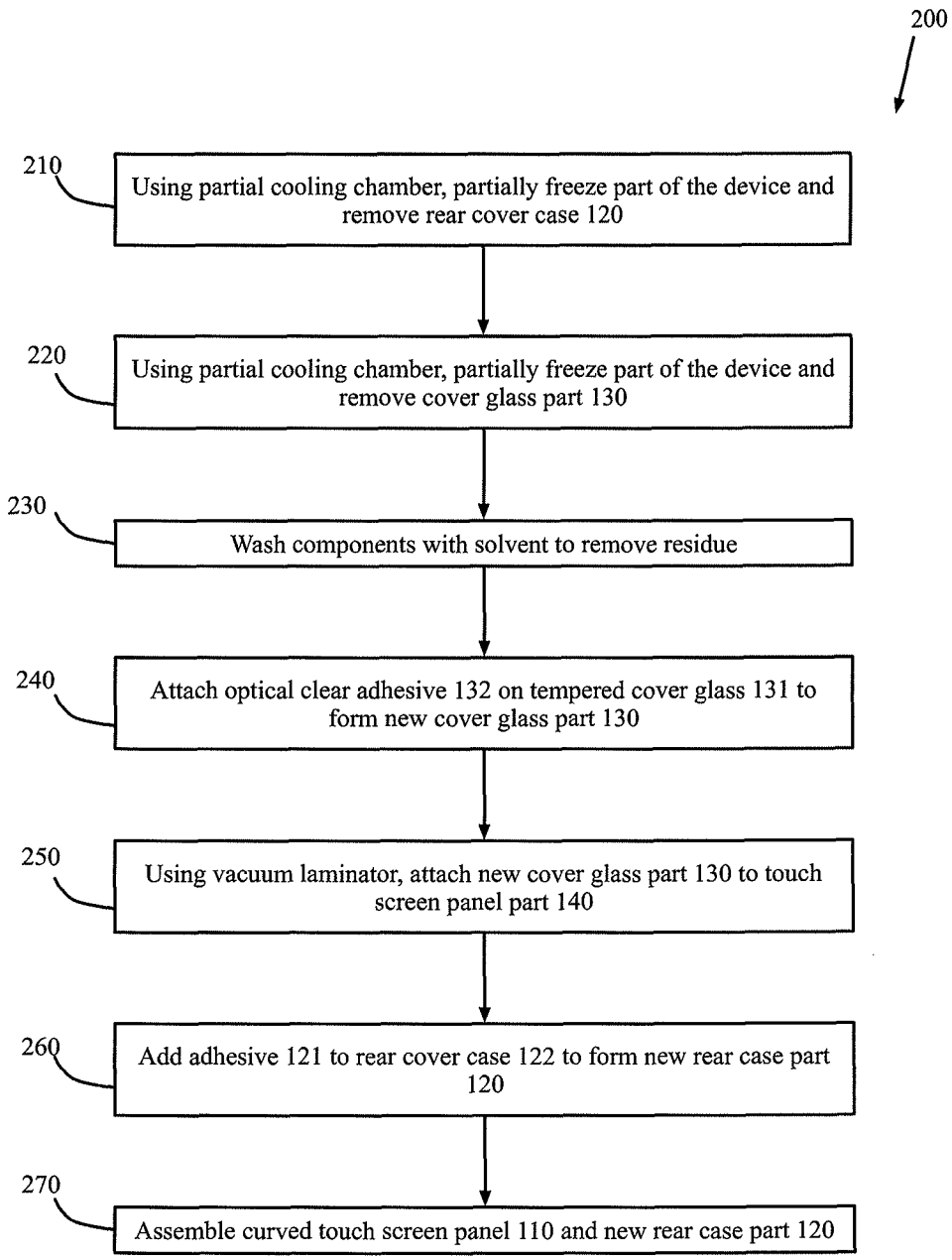
FIG. 2 is a flow diagram illustrating a process for separating parts of a touch screen device according to an embodiment of the disclosure.

FIG. 2 depicts flow diagram 200, which illustrates a process for separating parts of touch screen device 100 according to an embodiment of the disclosure. A partial cooling chamber as disclosed in FIGS. 3-5 may be used to perform the process in FIG. 2. Initially, rear cover case 122 is removed using a partial cooling chamber that partially freezes part of device 100 (e.g., the outer surface of rear cover case 122) (step 210). Next, using the partial cooling chamber, cover glass part 130 is removed by partially freezing part of device 100 (e.g., outer surface of tempered cover glass 131 (step 220). At this point, both cover glass part 130 and rear case part 120 have been removed from touch screen panel part 140. Next, the separated components may be washed in a solvent to remove unwanted residue from the steps above (step 260). In an advantageous embodiment, the solvent used may be ISOPAR G fluid, which is available from ExxonMobil Chemical Company. ISOPAR G fluid comprises C9-11 isoalkanes (70%) and C10-13 isoalkanes (30%).

Next, device 100 may be reassembled using new replacement parts. A new layer of optical clear adhesive layer 132 is deposited on tempered cover glass 131 to form new cover glass part 130 (step 240). Using a vacuum laminator, new/repaired cover glass part 130 is attached to touch screen panel part 140 (step 250). Next, new adhesive layer 121 is added to rear cover case 122 to form new/repaired rear case part 120 (step 260). Thereafter, curved touch screen panel 110 and new rear case part 120 are assembled to form a repaired touch screen device 100 (step 270).

Figure 3:
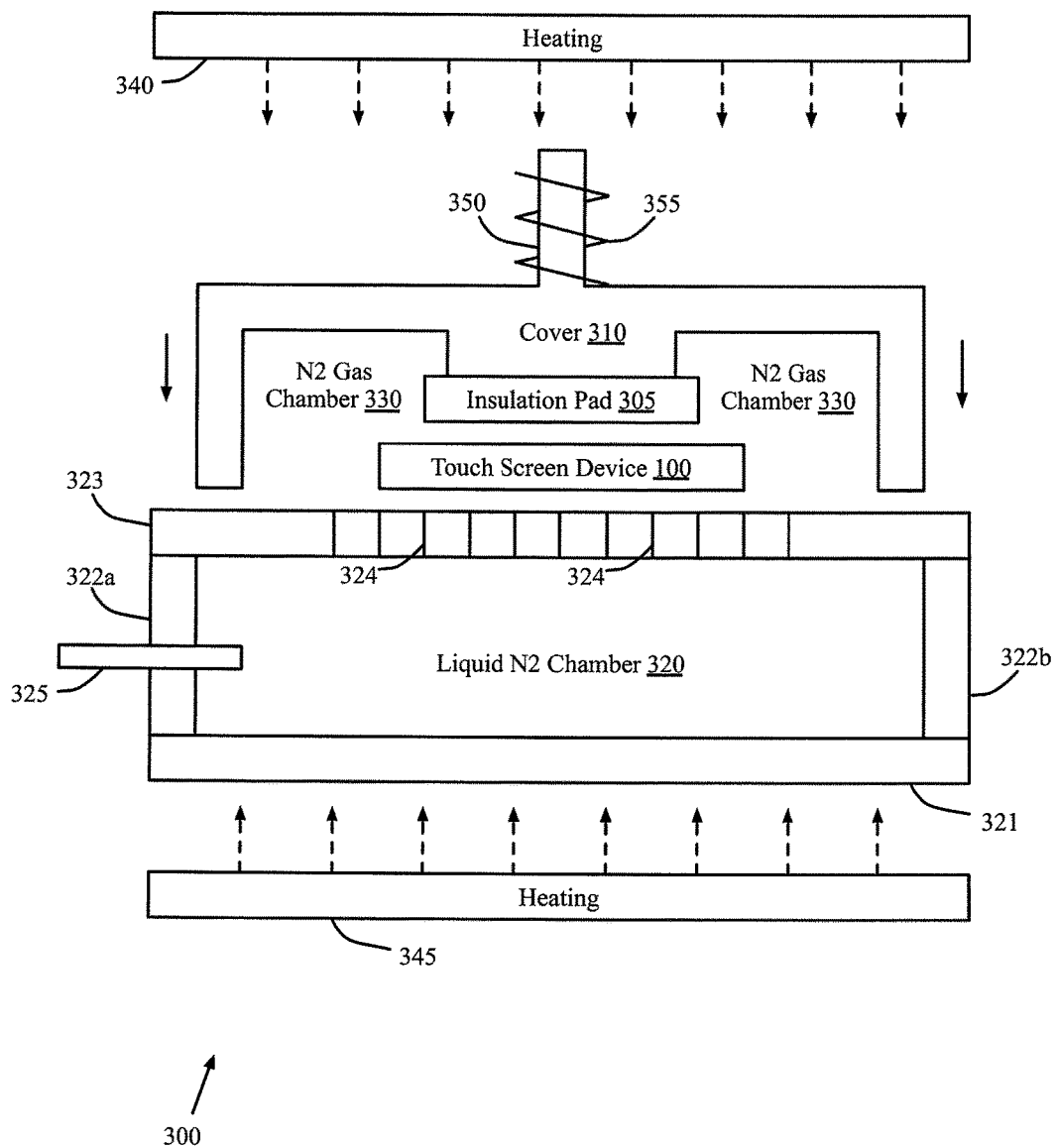
FIG. 3 illustrates an apparatus for separating the rear case part of a touch screen device according to an embodiment of the disclosure.

FIG. 3 illustrates a cross-sectional view of apparatus 300 for separating parts of touch screen device 100 according to an embodiment of the disclosure. Apparatus 300 comprises cover 310, bottom wall 321, sidewalls 322a and 322b, top wall 323, and heating elements 340 and 345. Bottom wall 321, sidewalls 322a and 322b, and top wall 323 define liquid nitrogen chamber 320. Liquid nitrogen is introduced into chamber 320 by hose 325. The liquid nitrogen evaporates into nitrogen gas as heating elements 340 and 345 warm the ambient air outside of chamber 320. The frigid nitrogen gas escapes from chamber 320 through vent holes 324 in top wall 323.

Touch screen device 100 is positioned above top wall 323 and underneath cover 310. When cover 310 is lowered by means of drive rod 350 and spring 355 (or other mechanical means), cover 310 forms a seal with the periphery of top wall 323 and creates nitrogen gas chamber 330 between cover 310 and top wall 323. The cold nitrogen gas escaping through vent holes 324 then fills nitrogen gas chamber 330 and freezes the exposed surfaces of touch screen device 100. When cover 310 is lowered, cover 310 also presses insulation pad 305 into contact with the upper surface of touch screen device 100, thereby protecting the region of touch screen device beneath insulation pad 305 from being frozen by the nitrogen gas.

Figure 4:
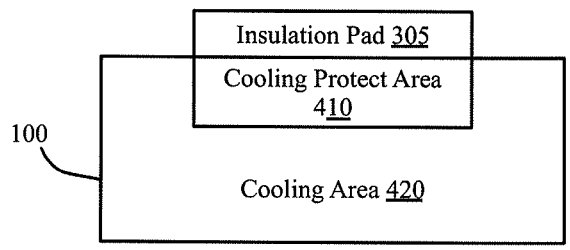
FIG. 4 is a detailed view of a portion of the apparatus in FIG. 3 according to an embodiment of the disclosure.

FIG. 4 is a detailed view of a portion of the apparatus in FIG. 3 according to an embodiment of the disclosure. Insulation pad 305 is pressed into contact with the upper surface of touch screen device 100. As nitrogen gas cools the exterior of device 100, insulation pad 305 creates cooling protect area 410 that remains warmer than the rest of the body of device 100 (i.e., cooling area 420. Thus, any adhesive layer that is in cooling protect area 410 will remain relatively warm and retain its adhesive properties, while any adhesive layer that is in cooling area 420 will loses its adhesiveness.

In an exemplary embodiment, cooling protect area 410 may be cooled to between 0° C. and −30° C. and cooling area 420 may be cooled to between −40° C. and −80° C. Due to its thinness, tempered cover glass 131 may be cooled for between 7 seconds and 35 seconds. Rear case part 120 may be cooled for between 35 seconds and 70 seconds. For a small apparatus 300 or 500 that is sufficient in size to hold a smartphone, approximately 200-400 milliliters of liquid nitrogen may be used.

Figure 5:
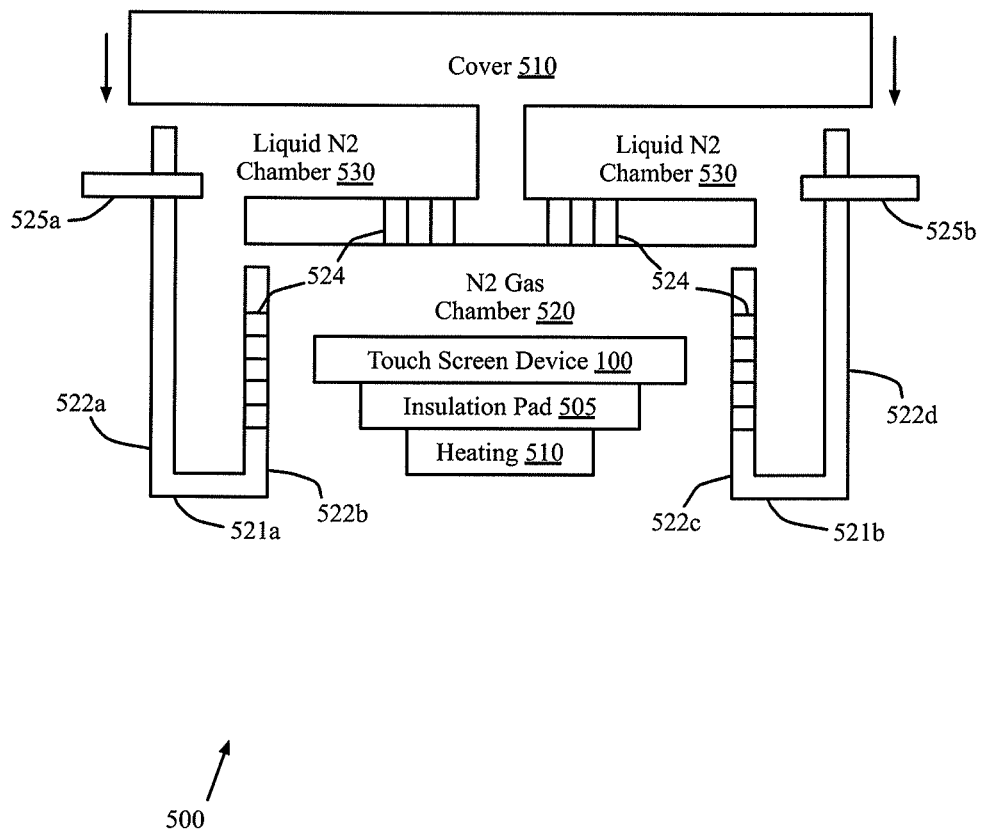
FIG. 5 illustrates an apparatus for separating the cover glass part of a touch screen device according to another embodiment of the disclosure.

FIG. 5 illustrates a cross-sectional view of apparatus 500 for separating parts of touch screen device 100 according to another embodiment of the disclosure. Apparatus 500 comprises cover 510, bottom walls 521a and 521b, sidewalls 522a, 522b, 522c, and 522d, and heating element 510. Bottom walls 521a and 521b, and sidewalls 522a-522d, and cover 510 define liquid nitrogen chamber 530. Liquid nitrogen is introduced into chamber 530 by hoses 525a and 525b. The liquid nitrogen evaporates into nitrogen gas as heating element 510 and other heating elements (not shown) warm the ambient air outside of chamber 530. The frigid nitrogen gas escapes from chamber 530 through vent holes 524 in cover 510. The hoses 525a and 525b are shown passing through the sidewalls 5222a and 522d. In an alternate embodiment, one or both of hoses 525a and 525d may pass through cover 510.

Touch screen device 100 is positioned below cover 510 and above the surface (not shown) on which apparatus 500 rests. When cover 510 is lowered by mechanical means (not shown), cover 510 forms a seal with the top edges of sidewalls 522a-522d and creates liquid nitrogen gas chamber 530. Lowering cover 510 also creates nitrogen gas chamber 520 between cover 510 and the surface on which apparatus 500 rests. The cold nitrogen gas escaping through vent holes 524 then fills nitrogen gas chamber 530 and freezes the exposed surfaces of touch screen device 100. Touch screen device 100 rests on insulation pad 505, thereby protecting the region of touch screen device above insulation pad 505 from being frozen by the nitrogen gas. This protected region is similar to cooling protect area 410 in FIG. 4.

Advantageously, either one of apparatus 300 and apparatus 500 may be used to perform the repair process in FIG. 2. In either case, nitrogen gas surrounds and freezes the exposed surfaces of touch screen device 100 to thereby create a cooling area 420 within the body of device 100. An adhesive layer within the cooling area 420 will lose its adhesive properties, so that components that are attached to each other by such a frozen adhesive layer are easily separated by tapping. In contrast, an adhesive layer within cooling protect area 410 retains its adhesiveness, so that components that are attached by such an adhesive layer will not separate by tapping.

Liquid nitrogen is usually at a temperature of around −195° Celsius and as it becomes gaseous nitrogen in the gas chamber, the temperature of the nitrogen slowly increases. A good temperature to separate the screen is approximately around −147° Celsius. Because the temperature of the nitrogen increases, it is important to create a short pathway to change from liquid state to gaseous state so that the chamber may maintain approximately −147° Celsius to separate the screen. Using gaseous nitrogen uses a smaller amount of nitrogen comparing to directly applying liquid nitrogen to a display screen device. In addition, by using a gas chamber, the gaseous nitrogen may be more evenly distributed than by directly applying liquid nitrogen.

Figure 6A:
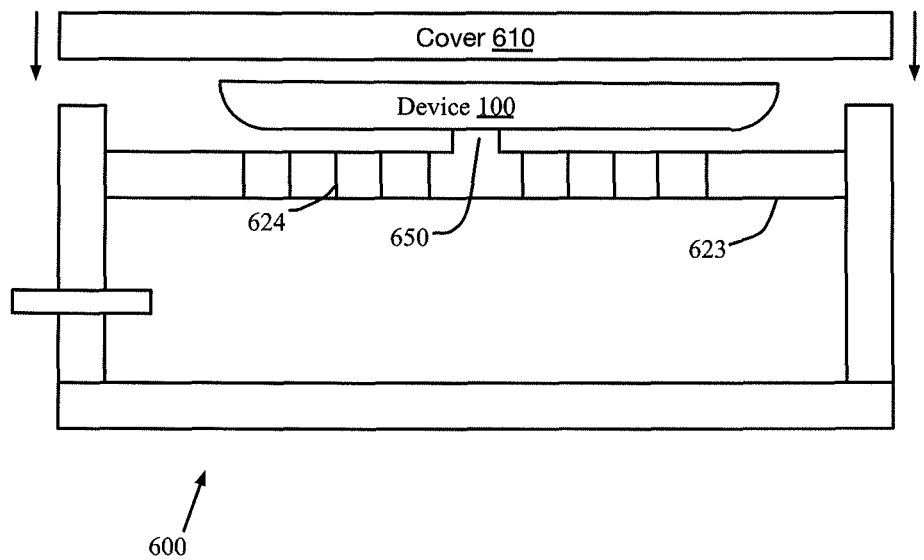
FIGS. 6A and 6B illustrate a detailed view of a portion of an apparatus similar to the apparatus in FIG. 3 according to an alternate embodiment of the disclosure.
Figure 6B:
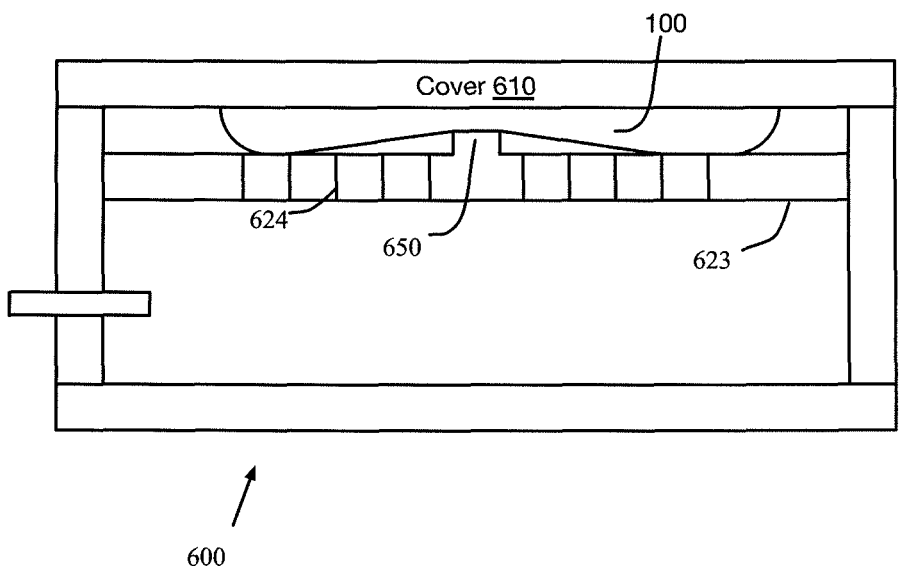

FIGS. 6A and 6B illustrates a detailed view of a portion of apparatus 600, which is similar to apparatus 300 in FIG. 3 according to an alternate embodiment of the disclosure. Those skilled in the art will understand in another alternate embodiment, apparatus 600 may be implement as a modification to apparatus 500 in FIG. 5. For simplification, many of the components in FIG. 3 have been omitted in FIG. 6 as they are not necessary to explain the operation of apparatus 600.

As in the previous embodiments, apparatus 600 comprises top wall 623, which includes a plurality of vent holes 624. Top wall 623 further includes protrusion 650 on the surface of top wall 623 that faces touch screen device 100. Protrusion 650 may be a simple bump or ridge on top wall 623. In FIGS. 6A and 6B, it should be understood that device 100 and protrusion 650 are not intended to be shown to scale. In FIGS. 6A and 6B, cover 610 may represent both a cover and an insulation pad as in the previous embodiments in FIGS. 3 and 5.

In FIG. 6A, cover 610 has not yet been pressed downward (as indicated by arrows) on device 100. Device 100 includes a bendable screen that is substantially flat prior to cover 610 being pressed downward. In FIG. 6B, however, cover 610 has been pressed down onto device 100, thereby pressing device 100 onto protrusion 650. The effect is to bend the screen of device 100 as shown in FIG. 6B (bending not to scale). This bending by protrusion 650 causes the touch screen panel part 140 to more easily separate from the other parts of device 100.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for disassembling a display screen device comprising:
    a liquid nitrogen chamber configured to receive liquid nitrogen, wherein at least one wall of the liquid nitrogen chamber has at least one vent hole that enables cold nitrogen gas to escape from the liquid nitrogen chamber;
    a nitrogen gas chamber adjacent to the liquid nitrogen chamber such that at least one wall of the liquid nitrogen chamber having the at least one vent hole separates the liquid nitrogen chamber and the nitrogen gas chamber, the nitrogen gas chamber configured to receive the nitrogen gas escaping from the liquid nitrogen chamber;
    a cover configured to be lowered to seal the apparatus and form a top wall for at least one of the liquid nitrogen chamber and the nitrogen gas chamber; and
    a protrusion protruding up from a bottom surface of the nitrogen gas chamber towards a surface of the display screen device such that lowering the cover to seal the apparatus causes a bending of the screen,
    wherein the display screen device is disposed within the nitrogen gas chamber.

2. The apparatus as set forth in claim 1, wherein the nitrogen gas freezes exposed surfaces of the display screen device.

3. The apparatus as set forth in claim 2, wherein an adhesive layer disposed in a cooling area of the display screen device at an exposed surface loses its adhesiveness as the cooling area becomes colder.

4. The apparatus as set forth in claim 2, wherein the cover comprises an insulation pad disposed configured to be brought into contact with a protected surface of the display screen device.

5. The apparatus as set forth in claim 4, wherein the insulation pad creates a cooling protect area within the display screen device at the protected surface.

6. The apparatus as set forth in claim 5, wherein an adhesive layer disposed in the cooling protect area of the display screen device retains its adhesiveness as other portions of the display screen device become colder.

7. A method of disassembling a display screen device comprising:
    using nitrogen gas to partially freeze a first part of the display screen device;
    waiting until an adhesive layer in the first part of the display screen device cools sufficiently to lose its adhesiveness; and
    separating the first part of the display screen device from a remainder of the display screen device.

8. The method as set forth in claim 7, wherein using nitrogen gas comprises:
    evaporating liquid nitrogen to form the nitrogen gas; and
    exposing the first part of the display screen device to the nitrogen gas.

9. The method as set forth in claim 7, wherein the first part of the display screen device comprises a rear cover case.

10. The method as set forth in claim 7, wherein the first part of the display screen device comprises a tempered cover glass.

11. The method as set forth in claim 7, further comprising:
    cleaning the first part of the display screen device and the remainder of the display screen device using a solvent fluid.

* * * * *